US012415697B2

(12) United States Patent
Ban

(10) Patent No.: US 12,415,697 B2
(45) Date of Patent: Sep. 16, 2025

(54) TRANSPORT DEVICE AND RECORDING DEVICE

(71) Applicant: SEIKO EPSON CORPORATION, Tokyo (JP)

(72) Inventor: Ryosuke Ban, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 385 days.

(21) Appl. No.: 18/183,808

(22) Filed: Mar. 14, 2023

(65) Prior Publication Data

US 2023/0294947 A1 Sep. 21, 2023

(30) Foreign Application Priority Data

Mar. 15, 2022 (JP) ................................ 2022-039993

(51) Int. Cl.
*B65H 20/06* (2006.01)
*B41J 11/00* (2006.01)

(52) U.S. Cl.
CPC ............. *B65H 20/06* (2013.01); *B41J 11/007* (2013.01); *B65H 2403/25* (2013.01); *B65H 2801/21* (2013.01)

(58) Field of Classification Search
CPC ................ B65H 20/06; B65H 2403/25; B65H 2801/21; B41J 11/007
See application file for complete search history.

(56) References Cited

U.S. PATENT DOCUMENTS 7,347,318 B2 * 3/2008 Kato .................. G03G 15/1685 399/116

FOREIGN PATENT DOCUMENTS

JP 2021-147181 A 9/2021

* cited by examiner

*Primary Examiner* — Geoffrey S Mruk
(74) *Attorney, Agent, or Firm* — WORKMAN NYDEGGER

(57) ABSTRACT

A transport device includes a transporting belt having an endless shape and configured to transport a medium, a first roller including a first circumferential surface brought into contact with the transporting belt, the first roller being a roller around which the transporting belt is wound, a second roller including a second circumferential surface brought into contact with the transporting belt, the second roller being a roller around which the transporting belt is wound, a pressing section including a bearing unit including a contact portion brought into contact with the first circumferential surface, the pressing section being configured to press the first circumferential surface on an inner side of the transporting belt, and a support portion disposed on an inner side of the transporting belt and configured to support the pressing section.

6 Claims, 6 Drawing Sheets

TRANSPORT DEVICE AND RECORDING DEVICE

The present application is based on, and claims priority from JP Application Serial Number 2022-039993, filed on Mar. 15, 2022, the disclosure of which is hereby incorporated by reference herein in its entirety.

BACKGROUND

1. Technical Field

The present disclosure relates to a transport device and a recording device.

2. Related Art

There are known a transport device configured to transport a printing medium, and a printing apparatus that includes the transport device. A transport device described in JP-A-2021-147181 includes a belt transport roller, a belt-rotated roller, and a transporting belt. In addition, the transport device includes a tension adjustment unit. The tension adjustment unit biases a base portion configured to support the belt-rotated roller. By biasing the base portion, the tension adjustment unit adjusts the belt tension of the transporting belt. The base portion supports a shaft end portion of the belt-rotated roller.

In a case of the transport device that transports the printing medium using the transporting belt, a difference in peripheral speeds of the transporting belt may vary depending on locations within the transporting belt.

SUMMARY

A transport device according to the present disclosure includes a transporting belt having an endless shape and configured to transport a medium, a first roller including a first circumferential surface brought into contact with the transporting belt, the first roller being a roller around which the transporting belt is wound, a second roller including a second circumferential surface brought into contact with the transporting belt, the second roller being a roller around which the transporting belt is wound, a pressing section including a bearing unit including a contact portion brought into contact with the first circumferential surface, the pressing section being configured to press the first circumferential surface on an inner side of the transporting belt, and a support portion disposed on an inner side of the transporting belt and configured to support the pressing section.

A recording device according to the present disclosure includes a transporting belt having an endless shape and configured to transport a medium, a first roller including a first circumferential surface brought into contact with the transporting belt, the first roller being a roller around which the transporting belt is wound, a second roller including a second circumferential surface brought into contact with the transporting belt, the second roller being a roller around which the transporting belt is wound, a pressing section including a bearing unit including a contact portion brought into contact with the first circumferential surface, the pressing section being configured to press the first circumferential surface on an inner side of the transporting belt, a support portion disposed on an inner side of the transporting belt and configured to support the pressing section, and a recording unit configured to perform recording on the medium transported by the transporting belt.

DESCRIPTION OF EXEMPLARY EMBODIMENTS

Figure 1:
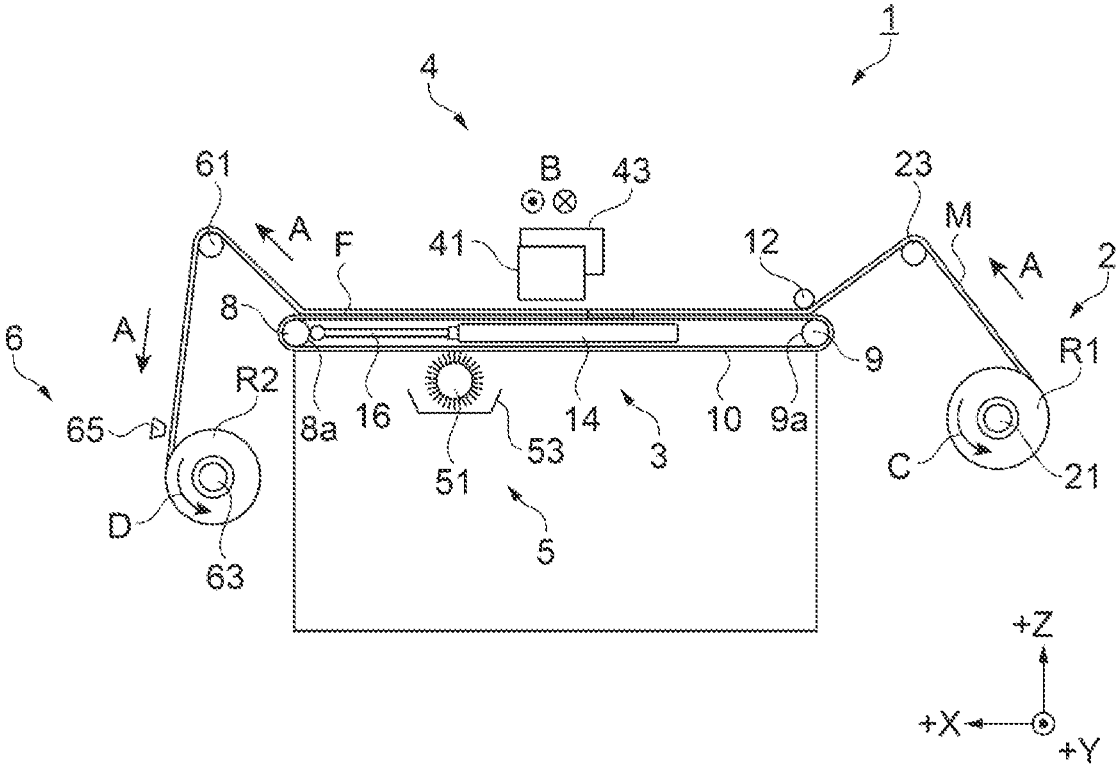
FIG. 1 is a diagram illustrating a schematic configuration of a printer.

FIG. 1 illustrates a schematic configuration of a printer 1. The printer 1 performs printing on a printing medium M. As one example, the printer 1 is an inkjet printer configured to discharge ink on the printing medium M to perform printing on the printing medium M. The printer 1 corresponds to one example of a recording device. The printing medium M corresponds to one example of a medium.

The plurality of figures including FIG. 1 illustrate a XYZ coordinate system. The X-axis, the Y-axis, and the Z-axis are perpendicular to each other. The Z-axis is an axis perpendicular to the installation surface of the printer 1 that is not illustrated. The X-axis and the Y-axis are parallel to the installation surface. The X-axis is an axis extending along a direction in which the upper surface of a medium transporting belt 10, which will be described later, moves. The Y-axis is an axis intersecting, at a right angle, the direction in which the upper surface of the medium transporting belt 10 moves. A direction extending along the Z-axis from the installation surface toward the upward direction is referred to as the +Z direction. A direction extending along the Z-axis from the installation surface toward the downward direction is referred to as the −Z direction. The direction in which the upper surface of the medium transporting belt 10 moves is referred to as a +X direction. The reverse direction to the direction in which the upper surface of the medium transporting belt 10 moves is referred to as a −X direction. A direction from the rear direction of the printer 1 illustrated in FIG. 1 toward the front direction is referred to as a +Y direction. A direction from the front direction of the printer 1 illustrated in FIG. 1 toward the rear direction is referred to as a −Y direction.

The printer 1 includes a feeding unit 2, a transport unit 3, a printing unit 4, a cleaning unit 5, and a winding unit 6. The printer 1 illustrated in FIG. 1 performs printing on the printing medium M wound around the feeding unit 2. The printer 1 is an inkjet printer configured to discharge ink on the printing medium M to perform printing.

The feeding unit 2 feeds the printing medium M from a medium roll R1. The medium roll R1 is a roll obtained by rolling the printing medium M into a roll form. The feeding unit 2 includes a roll rotary shaft 21, a rotary-shaft driving mechanism, which is not illustrated in the drawing, and a guide roller 23.

The roll rotary shaft 21 rotatably supports the medium roll R1. The medium roll R1 is installed at the roll rotary shaft 21 by a user. The roll rotary shaft 21 rotates in a rotational direction C to cause the printing medium M to be fed from the medium roll R1. The fed printing medium M is transported in a transport direction A.

The rotary-shaft driving mechanism causes the roll rotary shaft 21 to rotate in the rotational direction C. The rotary-shaft driving mechanism causes the roll rotary shaft 21 to rotate, thereby feeding the printing medium M from the medium roll R1. The rotary-shaft driving mechanism may adjust the tension of the printing medium M that is being fed.

The guide roller 23 guides the printing medium M. The guide roller 23 transports, to the transport unit 3, the printing medium M fed from the medium roll R1. The guide roller 23 may adjust the tension of the printing medium M. With a tension adjusting mechanism that is not illustrated in the drawing, the guide roller 23 moves in the +Z direction or the −Z direction. As the guide roller 23 moves in the +Z direction or the −Z direction, the guide roller 23 adjusts the tension of the printing medium M.

The transport unit 3 transports the printing medium M to a position that is opposed to the printing unit 4. The transport unit 3 includes a driving roller 8, a driving mechanism that is not illustrated in the drawing, a driven roller 9, the medium transporting belt 10, a pressure applying roller 12, a support frame 14, and a pressing unit 16. The transport unit 3 corresponds to one example of a transport device.

The driving roller 8 rotationally moves the medium transporting belt 10. The driving roller 8 is disposed at the +X direction of the printing unit 4. The driving roller 8 includes a driving-roller circumferential surface 8*a*. The driving-roller circumferential surface 8*a* is brought into contact with the medium transporting belt 10. The driving-roller circumferential surface 8*a* transmits driving force of the driving roller 8 to the medium transporting belt 10. The driving roller 8 corresponds to one example of a first roller or a second roller. The driving-roller circumferential surface 8*a* corresponds to one example of a first circumferential surface or a second circumferential surface.

The driving roller 8 illustrated in FIG. 1 is a straight roller configured to have an outer diameter constant within tolerance limits. It is preferable that the driving roller 8 is a crown roller configured such that the outer diameter of the central portion, in the rotary shaft direction, of the driving roller 8 is greater than the outer diameter of each end portion, in the rotary shaft direction, of the driving roller 8. For the driving roller 8 having a length of not less than 1000 mm, it is preferable that a difference between the outer diameter of the central portion, in the rotary shaft direction, of the crown roller and the outer diameter of each end portion in the rotary shaft direction falls in a range of not less than 5 μm and not more than 200 μm.

It is preferable that the driving roller 8 is a crown roller.

With the driving roller 8 being configured as a crown roller, it is possible to reduce deformation, in the −X direction, of the central portion, in the rotary shaft direction, of the driving roller 8 due to the tension of the medium transporting belt 10.

The driving mechanism causes the driving roller 8 to rotationally drive. The driving mechanism generates rotational driving force. The driving mechanism transmits the generated rotational driving force to the driving roller 8. By transmitting the rotational driving force, the driving mechanism causes the driving roller 8 to rotate. The driving mechanism transmits the rotational driving force from the shaft end portion of the driving roller 8.

The driven roller 9 supports the medium transporting belt 10 so as to be able to rotationally move. The driven roller 9 is disposed at the −X direction of the printing unit 4. The driven roller 9 is rotatably supported by a main body frame or the like that is not illustrated in the drawing. The driven roller 9 includes a driven-roller circumferential surface 9*a*. The driven-roller circumferential surface 9*a* is brought into contact with the medium transporting belt 10. When the medium transporting belt 10 rotationally moves, the driven-roller circumferential surface 9*a* followingly rotates. The driven roller 9 corresponds to one example of a first roller or a second roller. The driven-roller circumferential surface 9*a* corresponds to one example of a first circumferential surface or a second circumferential surface.

The driven roller 9 illustrated in FIG. 1 is a straight roller configured to have an outer diameter constant within tolerance limits. The driven roller 9 may be a crown roller configured such that the outer diameter of the central portion, in the rotary shaft direction, of the driven roller 9 is greater than the outer diameter of each end portion, in the rotary shaft direction, of the driven roller 9. For the driven roller 9 having a length of not less than 1000 mm, it is preferable that a difference between the outer diameter of the central portion, in the rotary shaft direction, of the crown roller and the outer diameter of each end portion falls in a range of not less than 5 μm and not more than 200 μm.

The medium transporting belt 10 transports the printing medium M. The medium transporting belt 10 is a belt having an endless shape. The medium transporting belt 10 is an adhesive belt having an outer peripheral surface provided with an adhesive layer F. The adhesive layer F includes an adhesive. The adhesive is a hot-melt based adhesive containing thermoplastic elastomer SIS as a primary component. The "SIS" stands for styrene-isoprene block copolymers. For example, the adhesive includes "Polixresin", "Newdine", and "Aquadine" series manufactured by Yokohama Polymer Co., Ltd, "MC polymer series" manufactured by Murayama Chemical Research, "UNIKENSOL RV-30 (for screen printing)" manufactured by Union Chemical Industry Co., Ltd, "Plaster EH" manufactured by Shin-Nakamura Chemical Co, Ltd, "ATRASOL GP1 (ATR code: ATR1717)" manufactured by ATR CHEMICALS SA, or the like. With the adhesive layer F, the medium transporting belt 10 causes the printing medium M to adhere to the outer peripheral surface thereof. The printing medium M fed from the feeding unit 2 is mounted on the medium transporting belt 10. The medium transporting belt 10 transports, in the +X direction, the printing medium M mounted thereon. The medium transporting belt 10 illustrated in FIG. 1 is extended in a tension manner by the driving roller 8 and the driven roller 9. The medium transporting belt 10 corresponds to one example of a transporting belt.

Although the medium transporting belt 10 illustrated in FIG. 1 is extended in a tension manner by the driving roller 8 and the driven roller 9, the configuration thereof is not limited to this. The medium transporting belt 10 may be extended in a tension manner by three or more rollers including the driving roller 8 and the driven roller 9.

The medium transporting belt 10 illustrated in FIG. 1 is an adhesive belt but is not limited to this. The medium transporting belt 10 may be an electrostatic adhering belt configured to electrostatically draw the printing medium M. There is no limitation applied to the mode of the medium transporting belt 10, provided that the medium transporting belt 10 has a function of holding the printing medium M and transporting the held printing medium M. It is preferable that the medium transporting belt 10 is an adhesive belt. The adhesive belt is able to hold various types of printing medium M such as fabric, and transport the held printing medium M.

The pressure applying roller 12 applies pressure to the printing medium M against the outer peripheral surface of the medium transporting belt 10. The pressure applying roller 12 applies pressure to the printing medium M guided by the guide roller 23, so as to be pressed onto the medium transporting belt 10. The pressure applying roller 12 causes the printing medium M to adhere to the outer peripheral surface of the medium transporting belt 10. With the pressure applied by the pressure applying roller 12, the printing medium M is caused to stick to the outer peripheral surface of the medium transporting belt 10. The printing medium M caused to stick is transported by the medium transporting belt 10 to a position that is opposed to the printing unit 4.

The support frame 14 is configured to support the pressing unit 16. The support frame 14 is disposed on an inner side of the medium transporting belt 10. The support frame 14 may be supported by a main body frame that is not illustrated in the drawing. The main body frame is disposed at the +Y direction of the medium transporting belt 10 and also at the −Y direction. The support frame 14 may constitute a platen that is opposed to the printing unit 4 with the medium transporting belt 10 being interposed therebetween. The support frame 14 may be in contact with the inner peripheral surface of the medium transporting belt 10 or may not be in contact with it. The support frame 14 corresponds to one example of a support portion.

The pressing unit 16 presses the driving roller 8 or a portion of the driven roller 9. The pressing unit 16 illustrated in FIG. 1 is brought into contact with the driving-roller circumferential surface 8*a* of the driving roller 8. The pressing unit 16 is brought into contact with the driving-roller circumferential surface 8*a* and presses the driving roller 8. The pressing unit 16 presses the driving-roller circumferential surface 8*a* on an inner side of the medium transporting belt 10. The structure of the pressing unit 16 will be described later. The pressing unit 16 corresponds to one example of a pressing section.

The printing unit 4 performs printing on the printing medium M. The printing unit 4 includes a printing head 41, a carriage 43, and a carriage driving mechanism that is not illustrated in the drawing. The printing unit 4 illustrated in FIG. 1 discharges ink on the printing medium M to perform printing. The printing unit 4 may be a laser type or the like configured to cause toner to be attached on the printing medium M to perform printing. The printing unit 4 corresponds to one example of a recording unit. Printing corresponds to one example of recording.

The printing head 41 discharges ink onto the printing medium M. The printing head 41 discharges ink onto the printing medium M to perform printing. The printing head 41 is an inkjet head. The printing head 41 discharges one or more types of ink.

The carriage 43 supports the printing head 41, and moves it along a drive axis B. The drive axis B is an imaginary axis extending along the Y-axis. The carriage 43 moves along the drive axis B and in the +Y direction and the −Y direction. The carriage 43 moves the supported printing head 41 along the drive axis B and in the +Y direction and the −Y direction. When the carriage 43 moves in the +Y direction or the −Y direction, the printing head 41 discharges ink onto the printing medium M.

The carriage driving mechanism causes the carriage 43 to move. The carriage driving mechanism generates driving force that causes the carriage 43 to move. The carriage driving mechanism transmits the generated driving force to the carriage 43. With the driving force transmitted to the carriage 43, the carriage 43 moves along the drive axis B.

The printing unit 4 illustrated in FIG. 1 includes the carriage 43. However, the configuration thereof is not limited to this configuration. The printing unit 4 may not include the carriage 43. As one example, when the printing head 41 is a line inkjet head including a nozzle row having a width equal to or larger than the width of the printing medium M along the Y-axis, the carriage 43 may not be used.

The cleaning unit 5 cleans the medium transporting belt 10. The cleaning unit 5 is provided at the −Z direction of the medium transporting belt 10. The cleaning unit 5 cleans the medium transporting belt 10 that moves from the driving roller 8 to the driven roller 9. The cleaning unit 5 includes a cleaning brush 51, a cleaning-brush driving mechanism that is not illustrated in the drawing, and a tray 53.

The cleaning brush 51 is brought into contact with the medium transporting belt 10, and cleans the adhesive layer F that is a front layer of the medium transporting belt 10. The cleaning brush 51 rotates with the brush rotary shaft being the center. The brush rotary shaft may be a shaft or may be an imaginary center axis of rotation. The cleaning brush 51 is configured by connecting a plurality of cleaning rollers along the brush rotary shaft. The cleaning brush 51 cleans the adhesive layer F using a cleaning agent.

The cleaning-brush driving mechanism causes the cleaning brush 51 to rotate. The cleaning-brush driving mechanism generates rotational force that causes the cleaning brush 51 to rotate. The cleaning-brush driving mechanism transmits the generated rotational force to the cleaning brush 51. With the transmitted rotational force, the cleaning brush 51 rotates in a predetermined direction. The rotating cleaning brush 51 is brought into contact with the adhesive layer F of the medium transporting belt 10 to clean the adhesive layer F.

The tray 53 stores a cleaning agent. The cleaning agent is a water-soluble solvent or the like such as water or alcohol aqueous solution. The cleaning agent may contain a surface-active agent, an anti-foaming agent, or the like. The tray 53 stores the cleaning agent supplied to the medium transporting belt 10 by the cleaning brush 51.

The cleaning unit 5 may include a blade or a height adjusting mechanism. The blade or the height adjusting mechanism is not illustrated in the drawing. The blade scrapes off dirt or the like attached on the cleaning brush 51. The height adjusting mechanism adjusts the height of the cleaning brush 51 along the Z-axis. As the height adjusting mechanism adjusts the height of the cleaning brush 51 along the Z-axis, the state of contact of the cleaning brush 51 with the medium transporting belt 10 is adjusted.

The winding unit 6 winds the printing medium M on which printing has performed at the printing unit 4. The winding unit 6 includes a winding guide roller 61, a winding shaft 63, and a winding-shaft driving mechanism that is not illustrated in the drawing. The winding unit 6 may include a cutter 65.

The winding guide roller 61 is configured to guide the printing medium M on which printing has been performed at the printing unit 4. The winding guide roller 61 guides the printing medium M transported in the transport direction A by the medium transporting belt 10. The winding guide roller 61 guides the printing medium M toward the winding shaft 63 disposed at the −Z direction relative to the winding guide roller 61. The winding guide roller 61 may adjust the tension applied to the printing medium M. The winding guide roller 61 moves in the +Z direction or the −Z direction with a winding-tension adjusting mechanism that is not illustrated in the drawing. By moving in the +Z direction or the −Z direction, the winding guide roller 61 adjusts the tension applied to the printing medium M moving toward the winding shaft 63.

The winding shaft 63 winds the printing medium M on which printing has been performed at the printing unit 4. By winding the printing medium M, the winding shaft 63 causes a printed-matter roll R2 to be formed. The winding shaft 63 rotatably supports the printed-matter roll R2. As for the winding shaft 63, a paper tube or the like may be installed by a user. The winding shaft 63 causes the printing medium M to be wound around the installed paper tube or the like. By rotating in a winding direction D, the winding shaft 63 winds the printing medium M.

The winding-shaft driving mechanism causes the winding shaft 63 to rotate in the winding direction D. By causing the winding shaft 63 to rotate, the winding-shaft driving mechanism causes the winding shaft 63 to wind the printing medium M transported from the winding guide roller 61. The winding-shaft driving mechanism may adjust the tension applied to the printing medium M that is transported by the winding unit 6.

The cutter 65 is configured to cut the printing medium M on which printing has been performed at the printing unit 4. The cutter 65 is disposed downstream of the winding guide roller 61 in the transport direction A. The cutter 65 partially cuts the printing medium M in a direction along the Y-axis. The cutter 65 may cut the printing medium M along the transport direction A. The cutter 65 may not be provided.

First Embodiment

Figure 2:
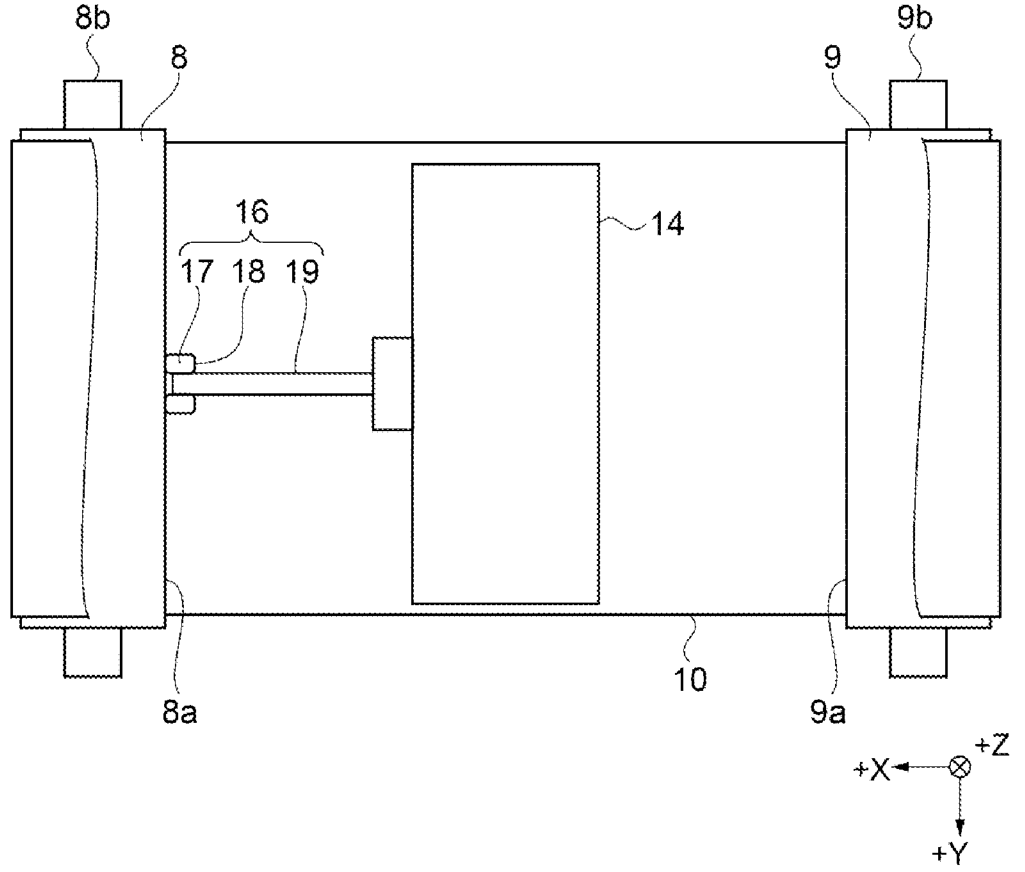
FIG. 2 is a diagram illustrating a schematic configuration of a transport unit as viewed from a +Z direction.
Figure 3:
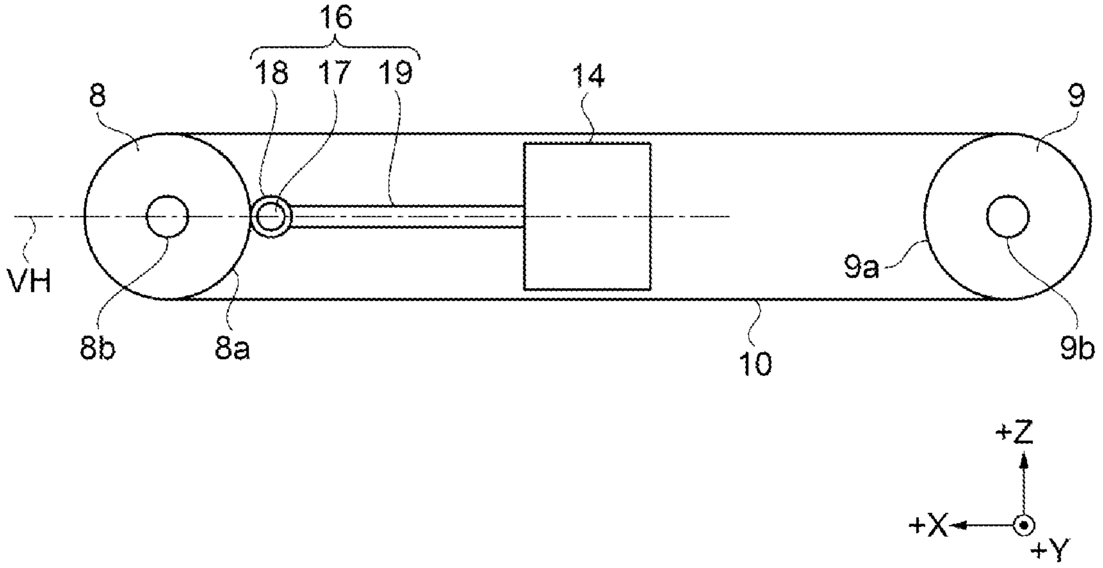
FIG. 3 is a diagram illustrating a schematic configuration of the transport unit as viewed from a +Y direction.

The first embodiment describes a configuration in which one pressing unit 16 is provided on an inner side of the medium transporting belt 10. FIGS. 2 and 3 illustrate the schematic configuration of the transport unit 3. FIG. 2 illustrates the schematic configuration of the transport unit 3 as viewed from the +Z direction. FIG. 3 illustrates the schematic configuration of the transport unit 3 as viewed from the +Y direction. In FIG. 2, neither the pressure applying roller 12 nor the upper surface portion of the medium transporting belt 10 is illustrated. The upper surface portion of the medium transporting belt 10 is a portion of the medium transporting belt 10 that is configured to transport the printing medium M. In FIG. 3, the pressure applying roller 12 is not illustrated.

FIG. 2 illustrates one pressing unit 16 configured to press the driving-roller circumferential surface 8*a* of the driving roller 8. FIG. 2 illustrates the driving roller 8, the driven roller 9, the lower surface portion of the medium transporting belt 10, the support frame 14, and the pressing unit 16. The driving roller 8 corresponds to one example of a first roller. The driven roller 9 corresponds to one example of a second roller.

The driving roller 8 includes the driving-roller circumferential surface 8*a* and a driving roller shaft 8*b*. The driving-roller circumferential surface 8*a* corresponds to one example of a first circumferential surface. The medium transporting belt 10 is wound around the driving-roller circumferential surface 8*a*. The rotational driving force from the driving mechanism is transmitted to the driving roller shaft 8*b*. The driving roller shaft 8*b* is rotatably supported by a main body frame or the like that is not illustrated in the drawing. The driving roller 8 rotates with the transmitted rotational driving force. With the rotation of the driving roller 8, the medium transporting belt 10 rotationally moves.

The driven roller 9 includes the driven-roller circumferential surface 9*a* and a driven roller shaft 9*b*. The driven-roller circumferential surface 9*a* corresponds to one example of a second circumferential surface. The medium transporting belt 10 is wound around the driven-roller circumferential surface 9*a*. The driven roller shaft 9*b* is rotatably supported by the main body frame or the like. When the medium transporting belt 10 rotationally moves, the driven roller 9 followingly rotates.

The driving roller 8 and the driven roller 9 give tension to the medium transporting belt 10. The tension is given to the medium transporting belt 10 using a tension applying mechanism that is provided at the driving roller 8 or the driven roller 9 and is not illustrated in the drawing. With the tension given to the medium transporting belt 10, deformation such as bending occurs in at least either of the driving roller 8 or the driven roller 9. As one example, with the tension of the medium transporting belt 10, the center portion of the driving roller 8 in the axial direction of the driving roller shaft 8*b* deforms in the −X direction. The central portion of the driving roller 8 in the axial direction of the driving roller shaft 8*b* deforms in the −X direction, and bending occurs in the driving roller shaft 8*b* so as to have an arc shape.

The support frame 14 supports the pressing unit 16. The support frame 14 is disposed on an inner side of the medium transporting belt 10 wound around the driving roller 8 and the driven roller 9. The support frame 14 is disposed between the driving roller 8 and the driven roller 9.

The pressing unit 16 presses a portion of the driving roller 8. The pressing unit 16 is disposed on an inner side of the medium transporting belt 10. The pressing unit 16 presses the driving-roller circumferential surface 8*a* of the driving roller 8 from the inner side of the medium transporting belt 10. The pressing unit 16 includes a bearing 17 and a bearing supporting member 19. The bearing 17 is configured so as to include a driven portion 18. The bearing 17 corresponds to one example of a bearing unit. The driven portion 18 corresponds to one example of a contact portion.

The bearing 17 presses a portion of the driving roller 8. The inner peripheral portion of the bearing 17 is supported by the bearing supporting member 19. The driven portion 18 that constitutes the outer peripheral portion of the bearing 17 is rotatably supported. The bearing 17 includes a ball bearing, a cylindrical roller bearing, a needle roller bearing, a plain bearing, or the like.

The driven portion 18 is brought into contact with the driving-roller circumferential surface 8*a*. The driven portion 18 is included in the bearing 17, and constitutes a portion of the bearing 17. The driven portion 18 presses the driving-roller circumferential surface 8*a*. With the rotation of the driving roller 8, the driven portion 18 followingly rotates. The driven portion 18 illustrated in FIG. 2 is a pair of tubular members configured such that the bearing supporting member 19 is interposed between them. The driven portion 18 illustrated in FIG. 2 presses a central portion of the driving roller 8 in the axial direction of the driving roller shaft 8*b*.

The bearing supporting member 19 supports the bearing 17. The bearing 17 is supported at the end portion, in the +X direction, of the bearing supporting member 19. The bearing supporting member 19 illustrated in FIG. 2 supports the bearing 17 at the central portion of the driven portion 18. The end portion, in the −X direction, of the bearing supporting member 19 is supported by the support frame 14. The length of the bearing supporting member 19 along the X-axis is adjusted on an as-necessary basis. By adjusting the length of the bearing supporting member 19, a user may adjust the pressing force that the pressing unit 16 applies to the driving-roller circumferential surface 8*a*.

FIG. 3 illustrates the driving roller 8, the driven roller 9, the medium transporting belt 10, the support frame 14, and the pressing unit 16. The support frame 14 and the pressing unit 16 are disposed on an inner side of the medium transporting belt 10. The pressing unit 16 presses the driving-roller circumferential surface 8*a* from the inner side of the medium transporting belt 10. The pressing unit 16 presses the driving-roller circumferential surface 8*a* on an imaginary horizontal line VH. The imaginary horizontal line VH is an imaginary line parallel to the X-axis passing through the center of rotation of the driving roller 8.

In a case of the driving roller 8, the central portion of the driving roller 8 in the axial direction of the driving roller shaft 8*b* may deform in the −X direction due to the tension of the medium transporting belt 10. When the central portion of the driving roller 8 in the axial direction of the driving roller shaft 8*b* deforms in the −X direction, the peripheral speed differs between the central portion and the end portion of the medium transporting belt 10 in the Y-axis direction. When the peripheral speed differs between the central portion and the end portion of the medium transporting belt 10 in the Y-axis direction, a difference occurs between an ink landing position at the central portion of the medium transporting belt 10 in the Y-axis direction and an ink landing position at the end portion of the medium transporting belt 10 in the Y-axis direction. The difference in the ink landing positions leads to a deterioration in the quality of the printed image. By causing the pressing unit 16 to press the position that deforms in the −X direction, a user causes the driving roller 8 to deform in the +X direction. By using the pressing unit 16, the user is able to correct the deformation of the driving roller 8. As the deformation of the driving roller 8 is corrected, the difference in peripheral speeds in the medium transporting belt 10 occurring due to the deformation of the driving roller 8 reduces. As the difference in peripheral speeds reduces, a difference in ink landing positions within the medium transporting belt 10 reduces. This reduces a deterioration in quality occurring due to the difference in ink landing positions.

The transport unit 3 includes: the medium transporting belt 10 having an endless shape and configured to transport the printing medium M; the driving roller 8 having the driving-roller circumferential surface 8*a* brought into contact with the medium transporting belt 10, the driving roller 8 being a roller around which the medium transporting belt 10 is wound; the driven roller 9 having the driven-roller circumferential surface 9*a* brought into contact with the medium transporting belt 10, the driven roller 9 being a roller around which the medium transporting belt 10 is wound; the pressing unit 16 including the bearing 17 including the driven portion 18 brought into contact with the driving-roller circumferential surface 8*a*, the pressing unit 16 being configured to press the driving-roller circumferential surface 8*a* on an inner side of the medium transporting belt 10; and the support frame 14 disposed on an inner side of the medium transporting belt 10 and configured to support the pressing unit 16.

The transport unit 3 is able to reduce the deformation of the driving roller 8 occurring at the time of extending the medium transporting belt 10 in a tension manner. The transport unit 3 is able to reduce the difference in peripheral speeds within the medium transporting belt 10.

The printer 1 includes: the medium transporting belt 10 having an endless shape and configured to transport the printing medium M; the driving roller 8 including the driving-roller circumferential surface 8*a* brought into contact with the medium transporting belt 10, the driving roller 8 being a roller around which the medium transporting belt 10 is wound; the driven roller 9 including the driven-roller circumferential surface 9*a* brought into contact with the medium transporting belt 10, the driven roller 9 being a roller around which the medium transporting belt 10 is wound; the pressing unit 16 including the bearing 17 including the driven portion 18 brought into contact with the driving-roller circumferential surface 8*a*, the pressing unit 16 being configured to press the driving-roller circumferential surface 8*a* on an inner side of the medium transporting belt 10; the support frame 14 disposed on an inner side of the medium transporting belt 10 and configured to support the pressing unit 16; and the printing unit 4 configured to perform printing on the printing medium M transported by the medium transporting belt 10.

The printer 1 is able to reduce the deformation of the driving roller 8 occurring at the time of extending the medium transporting belt 10 in a tension manner. By reducing the deformation of the driving roller 8, the printer 1 is able to reduce a deterioration in the quality of image.

In the first embodiment, the pressing unit 16 presses the driving roller 8. However, the configuration thereof is not limited to this. It may be possible to employ a configuration in which the pressing unit 16 presses the driven roller 9. By pressing the driven roller 9, the pressing unit 16 is able to reduce the deformation of the driven roller 9. In a case of the configuration in which the pressing unit 16 presses the driven roller 9, the driven roller 9 corresponds to one example of the first roller. The driven-roller circumferential surface 9*a* that is brought into contact with the driven portion 18 of the pressing unit 16 corresponds to one example of the first circumferential surface. The driving roller 8 corresponds to one example of the second roller. The driving-roller circumferential surface 8*a* corresponds to one example of the second circumferential surface.

When the medium transporting belt 10 is extended in a tension manner by three or more rollers including the driving roller 8 and the driven roller 9, the pressing unit 16 may press a roller differing from the driving roller 8 or the driven roller 9 as one example of the first roller.

Second Embodiment

Figure 4:
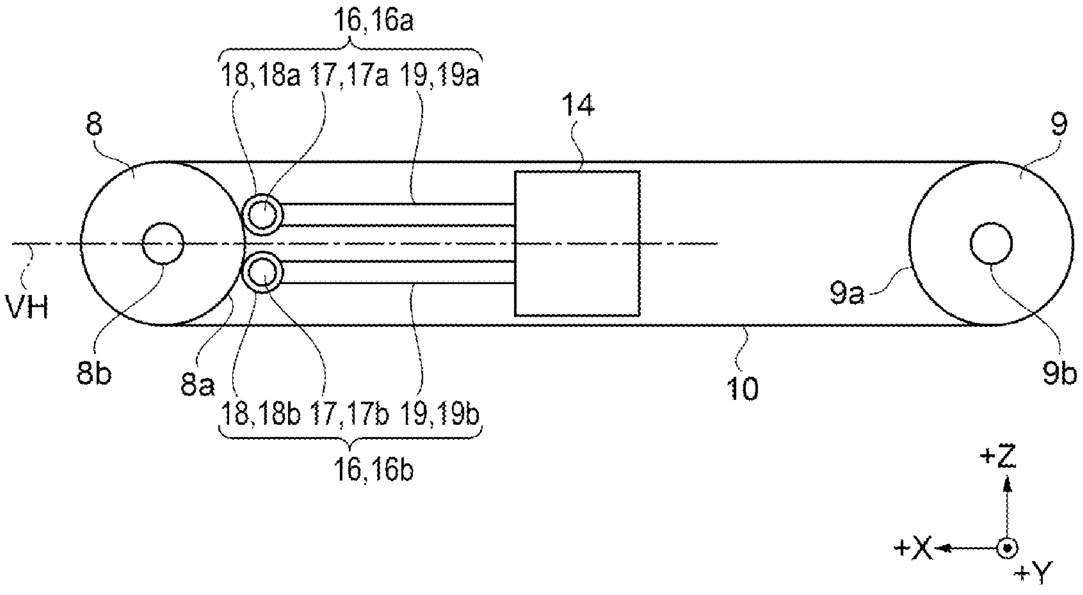
FIG. 4 is a diagram illustrating a schematic configuration of the transport unit as viewed from the +Y direction.
Figure 5:
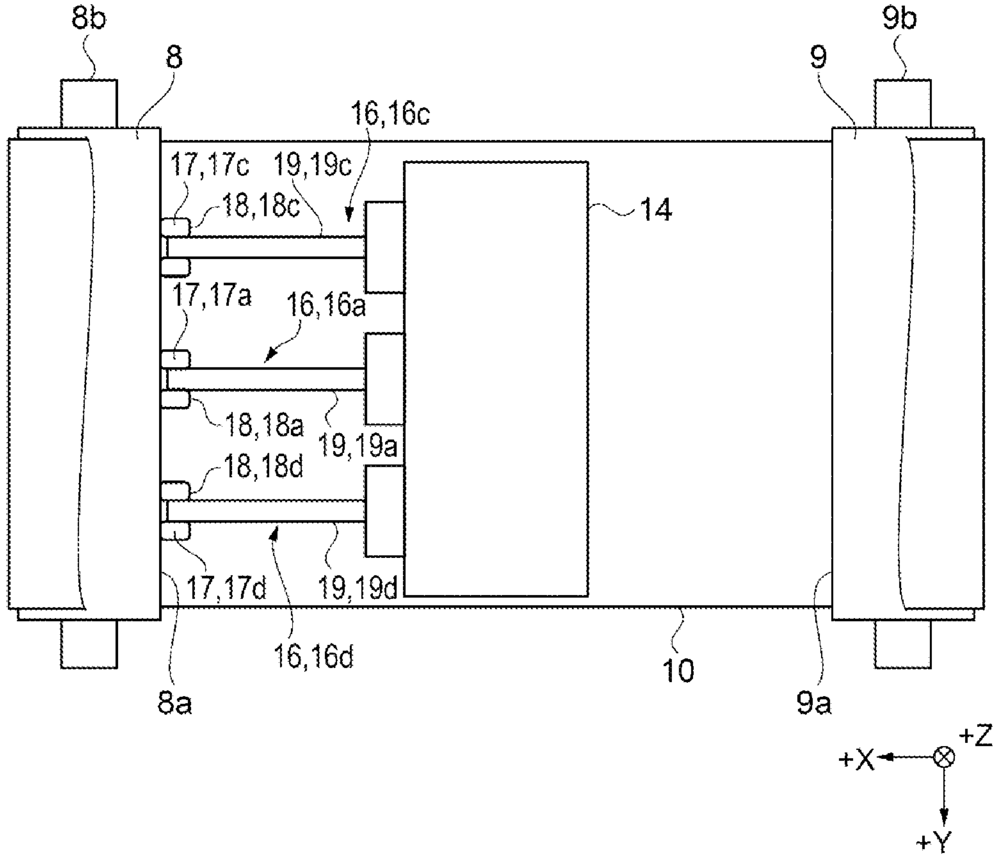
FIG. 5 is a diagram illustrating a schematic configuration of the transport unit as viewed from the +Z direction.

The second embodiment describes a configuration in which a plurality of pressing units 16 are disposed at the driving roller 8. FIGS. 4 and 5 each illustrate the configuration example of the second embodiment. FIG. 4 illustrates a schematic configuration of the transport unit 3 as viewed from the +Y direction. FIG. 4 illustrates one example of the second embodiment. In FIG. 4, the pressure applying roller 12 is not illustrated. FIG. 5 illustrates a schematic configuration of the transport unit 3 as viewed from the +Z direction. FIG. 5 illustrates one example of the second embodiment. In FIG. 5, the pressure applying roller 12 or the upper surface portion of the medium transporting belt 10 is not illustrated.

FIG. 4 illustrates the driving roller 8, the driven roller 9, the medium transporting belt 10, the support frame 14, and two pressing units 16. The two pressing unit 16 are a first pressing unit 16*a* and a second pressing unit 16*b*. The driving roller 8, the driven roller 9, the medium transporting belt 10, and the support frame 14 each have the same configuration as that in the first embodiment.

The first pressing unit 16*a* presses a portion of the driving-roller circumferential surface 8*a* of the driving roller 8. The first pressing unit 16*a* presses the central portion of the driving roller 8 in the axial direction of the driving roller shaft 8*b* as viewed from the +Z direction. The first pressing unit 16*a* presses the driving-roller circumferential surface 8*a* on an inner side of the medium transporting belt 10. The first pressing unit 16*a* includes a first bearing 17*a* and a first bearing supporting member 19*a*. The configuration of the first pressing unit 16*a* is the same as the configuration of the pressing unit 16 described in the first embodiment. The first pressing unit 16*a* corresponds to one example of a pressing section. The first bearing 17*a* corresponds to one example of a bearing unit.

The first bearing 17*a* includes a first driven portion 18*a*. The first bearing 17*a* is supported by the first bearing supporting member 19*a*. The first driven portion 18*a* is brought into contact with the driving-roller circumferential surface 8*a*, and presses the driving roller 8. The first driven portion 18*a* illustrated in FIG. 4 is brought into contact with the driving-roller circumferential surface 8*a* at a position in the +Z direction relative to the imaginary horizontal line VH. The first driven portion 18*a* corresponds to one example of a contact portion. The first bearing supporting member 19*a* supports the first bearing 17*a* at one end portion thereof in the X-axis direction, and is supported by the support frame 14 at the other end portion thereof in the X-axis direction.

The second pressing unit 16*b* presses a portion of the driving-roller circumferential surface 8*a* of the driving roller 8. The second pressing unit 16*b* presses the central portion of the driving roller 8 in the axial direction of the driving roller shaft 8*b* as viewed from the +Z direction. The second pressing unit 16*b* presses the driving-roller circumferential surface 8*a* on an inner side of the medium transporting belt 10. The second pressing unit 16*b* includes a second bearing 17*b* and a second bearing supporting member 19*b*. The configuration of the second pressing unit 16*b* is the same as the configuration of the first pressing unit 16*a*. The second pressing unit 16*b* corresponds to one example of a second pressing section.

The second bearing 17*b* includes a second driven portion 18*b*. The second bearing 17*b* is supported by the second bearing supporting member 19*b*. The second driven portion 18*b* is brought into contact with the driving-roller circumferential surface 8*a*, and presses the driving roller 8. The second driven portion 18*b* is brought into contact with the driving-roller circumferential surface 8*a* at a position in the −Z direction relative to the imaginary horizontal line VH. The distance between a position where the second driven portion 18*b* is brought into contact with the driving-roller circumferential surface 8*a* and the imaginary horizontal line VH is equal to or substantially equal to the distance between a position where the first driven portion 18*a* is brought into contact with the driving-roller circumferential surface 8*a* and the imaginary horizontal line VH. The second bearing supporting member 19*b* supports the second bearing 17*b* at one end portion thereof, and is supported by the support frame 14 at the other end portion thereof. The second bearing 17*b* corresponds to one example of a second bearing unit. The second driven portion 18*b* corresponds to one example of a second contact portion.

As illustrated in FIG. 4, the distance between a position where the second driven portion 18*b* is brought into contact with the driving-roller circumferential surface 8*a* and the imaginary horizontal line VH is equal to or substantially equal to the distance between a position where the first driven portion 18*a* is brought into contact with the driving-roller circumferential surface 8*a* and the imaginary horizontal line VH. Thus, by adding the vector of force with which the second driven portion 18*b* presses the driving-roller circumferential surface 8*a* and the vector of force with which the first driven portion 18*a* presses the driving-roller circumferential surface 8*a*, the resultant vector is a vector of force with which the driving roller 8 is pressed in a direction equal to the imaginary horizontal line VH or in a direction substantially equal to the imaginary horizontal line VH. Thus, the first pressing unit 16*a* and the second pressing unit 16*b* are able to press the driving roller 8 in a stable state. As the first pressing unit 16*a* and the second pressing unit 16*b* press the driving roller 8, the deformation of the driving roller 8 reduces. As the deformation of the driving roller 8 reduces, it is possible to reduce a deterioration in the quality of an image on the printed matter on which printing has been performed by the printer 1.

FIG. 5 illustrates the driving roller 8, the driven roller 9, the medium transporting belt 10, the support frame 14, and three pressing units 16. The three pressing units 16 are a first pressing unit 16*a*, a third pressing unit 16*c*, and a fourth pressing unit 16*d*. The driving roller 8, the driven roller 9, the medium transporting belt 10, and the support frame 14 each have the same configuration as that in the first embodiment.

The first pressing unit 16*a* presses a portion of the driving-roller circumferential surface 8*a* of the driving roller 8. The first pressing unit 16*a* presses the central portion of the driving roller 8 in the axial direction of the driving roller shaft 8*b* as viewed from the +Z direction. The first pressing unit 16*a* illustrated in FIG. 5 presses the driving roller 8 on the imaginary horizontal line VH as viewed from the +Y direction. The first pressing unit 16*a* presses the driving-roller circumferential surface 8*a* on an inner side of the medium transporting belt 10. The first pressing unit 16*a* includes the first bearing 17*a* and the first bearing supporting member 19*a*. The configuration of the first pressing unit 16*a* is the same as the configuration of the pressing unit 16 described in the first embodiment. The first pressing unit 16*a* corresponds to one example of the pressing section. The first bearing 17*a* corresponds to one example of the bearing unit.

The first bearing 17*a* includes the first driven portion 18*a*. The first bearing 17*a* is supported by the first bearing supporting member 19*a*. The first driven portion 18*a* is brought into contact with the driving-roller circumferential surface 8*a*, and presses the driving roller 8. The first driven portion 18*a* illustrated in FIG. 5 is brought into contact with the driving-roller circumferential surface 8*a* at the central portion of the driving roller 8 in the axial direction of the driving roller shaft 8*b*. The first driven portion 18*a* illustrated in FIG. 5 is brought into contact with the driving-roller circumferential surface 8*a* on the imaginary horizontal line VH as viewed from the +Y direction. The first driven portion 18*a* corresponds to one example of the contact portion. The first bearing supporting member 19*a* supports the first bearing 17*a* at one end portion thereof, and is supported by the support frame 14 at the other end portion thereof.

The third pressing unit 16*c* presses a portion of the driving-roller circumferential surface 8*a* of the driving roller 8. The third pressing unit 16*c* presses a position of the driving roller 8 that is located more at the −Y direction than the central portion thereof in the axial direction of the driving roller shaft 8*b*. The third pressing unit 16*c* presses the driving-roller circumferential surface 8*a* on an inner side of the medium transporting belt 10. The third pressing unit 16*c* includes a third bearing 17*c*, and a third bearing supporting member 19*c*. The configuration of the third pressing unit 16*c* is the same as the configuration of the first pressing unit 16*a*. The third pressing unit 16*c* corresponds to one example of the second pressing section.

The third bearing 17*c* includes a third driven portion 18*c*. The third bearing 17*c* is supported by the third bearing supporting member 19*c*. The third driven portion 18*c* is brought into contact with the driving-roller circumferential surface 8*a*, and presses the driving roller 8. The third driven portion 18*c* is brought into contact with the driving-roller circumferential surface 8*a* at the −Y direction relative to the first driven portion 18*a*. The third bearing supporting member 19*c* supports the third bearing 17*c* at one end portion thereof in the X-axis direction, and is supported by the support frame 14 at the other end portion thereof in the X-axis direction. The position, along the Y-axis, where the third driven portion 18*c* is brought into contact with the driving-roller circumferential surface 8*a* is adjusted by a user on an as-necessary basis. The third bearing 17*c* corresponds to one example of the second bearing unit. The third driven portion 18*c* corresponds to one example of the second contact portion.

The fourth pressing unit 16*d* presses a portion of the driving-roller circumferential surface 8*a* of the driving roller 8. The fourth pressing unit 16*d* presses a position of the driving roller 8 that is located more at the +Y direction than the central portion thereof in the axial direction of the driving roller shaft 8*b*. The fourth pressing unit 16*d* presses the driving-roller circumferential surface 8*a* on an inner side of the medium transporting belt 10. The fourth pressing unit 16*d* includes a fourth bearing 17*d* and a fourth bearing supporting member 19*d*. The configuration of the fourth pressing unit 16*d* is the same as the configuration of the first pressing unit 16*a*.

The fourth bearing 17*d* includes a fourth driven portion 18*d*. The fourth bearing 17*d* is supported by the fourth bearing supporting member 19*d*. The fourth driven portion 18*d* is brought into contact with the driving-roller circumferential surface 8*a*, and presses the driving roller 8. The fourth driven portion 18*d* is brought into contact with the driving-roller circumferential surface 8*a* at the +Y direction relative to the first driven portion 18*a*. The fourth bearing supporting member 19*d* supports the fourth bearing 17*d* at one end portion thereof in the X-axis direction, and is supported by the support frame 14 at the other end portion thereof in the X-axis direction. The position, along the Y-axis, where the fourth driven portion 18*d* is brought into contact with the driving-roller circumferential surface 8*a* is adjusted by a user on an as-necessary basis.

When the central portion of the driving roller 8 in the axial direction of the driving roller shaft 8*b* is deformed in the −X direction due to the tension of the medium transporting belt 10, it is preferable that the first pressing unit 16*a* is disposed at a position where the central portion of the driving roller 8 in the axial direction of the driving roller shaft 8*b* is pressed. It is preferable that the third pressing unit 16*c* and the fourth pressing unit 16*d* are disposed at a position of the −Y direction and a position of the +Y direction so as to be equidistantly spaced apart from the first pressing unit 16*a* along the Y-axis.

When the driving roller 8 is deformed in the −X direction at a plurality of positions in the axial direction of the driving roller shaft 8*b* due to the tension of the medium transporting belt 10, it is preferable that the first pressing unit 16*a*, the third pressing unit 16*c*, and the fourth pressing unit 16*d* are disposed at positions, in the axial direction of the driving roller shaft 8*b*, where the deformation in the −X direction occurs. The plurality of pressing units 16 are each disposed by a user as appropriate. In FIG. 5, three pressing units 16 are disposed. However, the configuration is not limited to this. Four or more pressing units 16 may be disposed.

It is preferable that the transport unit 3 includes the third pressing unit 16*c* including the third bearing 17*c* including the third driven portion 18*c* brought into contact with the driving-roller circumferential surface 8*a*, the third pressing unit 16*c* being configured to press the driving-roller circumferential surface 8*a* on an inner side of the medium transporting belt 10.

By pressing the driving roller 8 using two pressing units 16, the transport unit 3 is able to further reduce the deformation of the driving roller 8. As the deformation of the driving roller 8 reduces, it is possible to reduce a difference in peripheral speeds within the medium transporting belt 10.

In FIGS. 4 and 5, the driving roller 8 is pressed by the plurality of pressing units 16. However, the configuration is not limited to this. The plurality of pressing units 16 may press the driven roller 9. By pressing the driven roller 9 using the plurality of pressing units 16, it is possible to reduce the deformation of the driven roller 9. In addition, the configurations illustrated in FIGS. 4 and 5 may be combined on an as-necessary basis.

Third Embodiment

Figure 6:
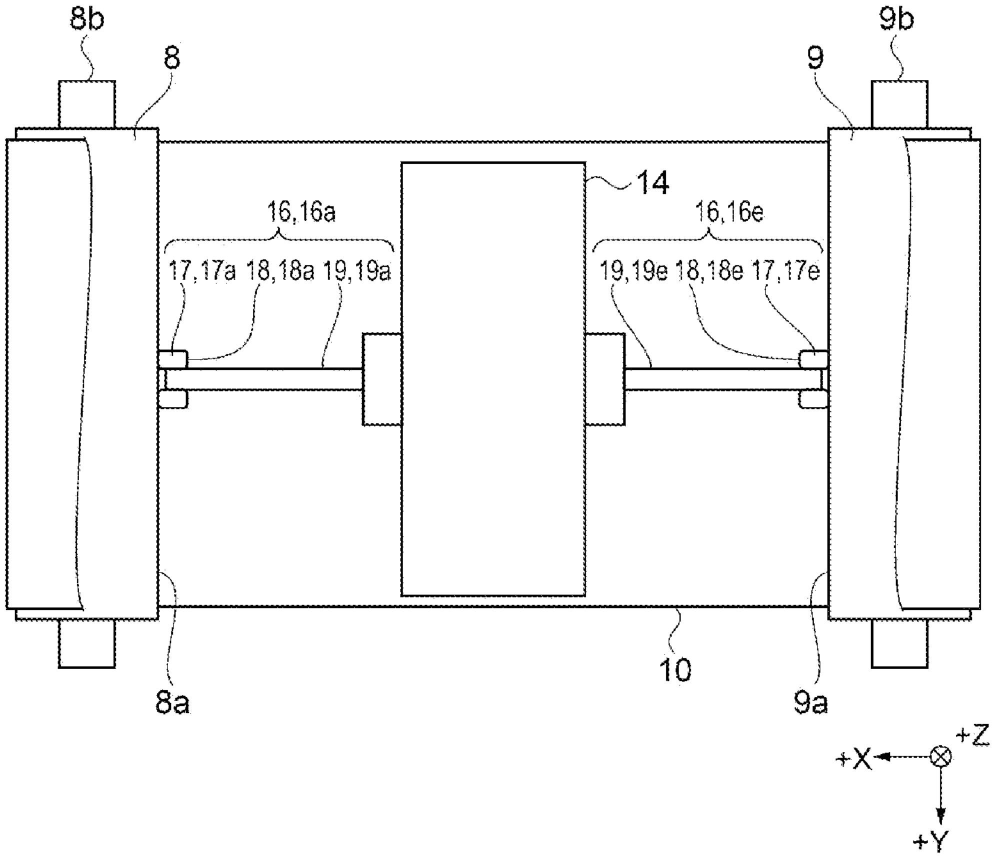
FIG. 6 is a diagram illustrating a schematic configuration of the transport unit as viewed from the +Z direction.
Figure 7:
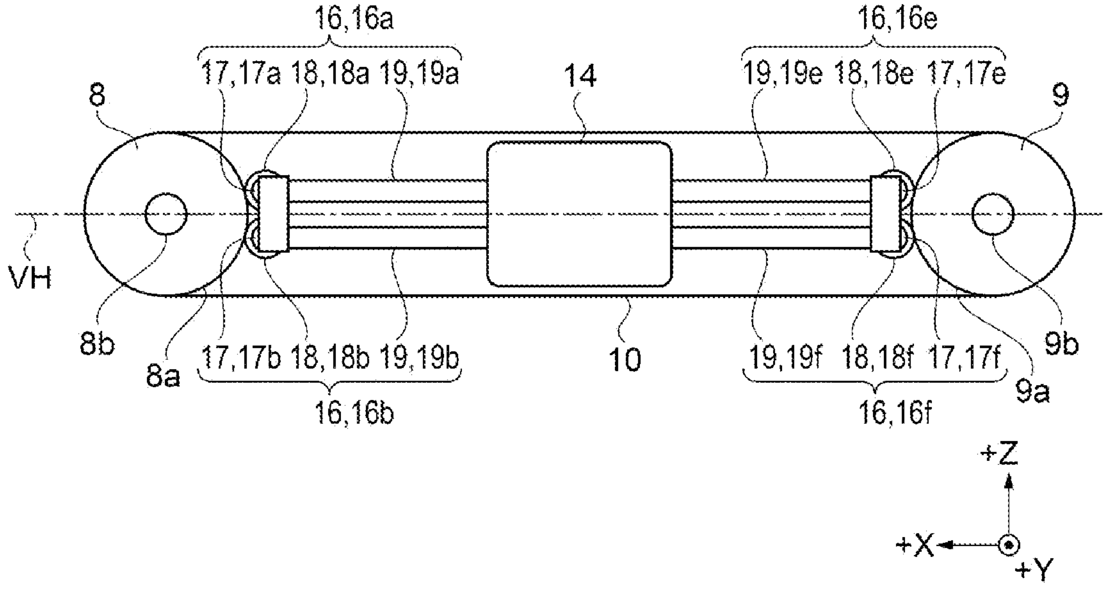
FIG. 7 is a diagram illustrating a schematic configuration of the transport unit as viewed from the +Y direction.

The third embodiment describes a configuration in which the pressing unit 16 is disposed at each of the driving roller 8 and the driven roller 9. FIGS. 6 and 7 each illustrate the configuration example of the third embodiment. FIG. 6 illustrates the schematic configuration of the transport unit 3 as viewed from the +Z direction. FIG. 6 illustrates one example of the third embodiment. In FIG. 6, neither the pressure applying roller 12 nor the upper surface portion of the medium transporting belt 10 is illustrated. FIG. 7 illustrates the schematic configuration of the transport unit 3 as viewed from the +Y direction. FIG. 7 illustrates one example of the third embodiment. In FIG. 7, the pressure applying roller 12 is not illustrated.

FIG. 6 illustrates the driving roller 8, the driven roller 9, the medium transporting belt 10, the support frame 14, and two pressing units 16. The two pressing units 16 are the first pressing unit 16*a*, and a fifth pressing unit 16*e*. The driving roller 8, the driven roller 9, the medium transporting belt 10, and the support frame 14 each have the same configuration as that in the first embodiment.

The first pressing unit 16*a* presses a portion of the driving-roller circumferential surface 8*a* of the driving roller 8. The first pressing unit 16*a* presses the central portion of the driving roller 8 in the axial direction of the driving roller shaft 8*b*. The first pressing unit 16*a* presses the driving-roller circumferential surface 8*a* on an inner side of the medium transporting belt 10. The first pressing unit 16*a* includes the first bearing 17*a* and the first bearing supporting member 19*a*. The configuration of the first pressing unit 16*a* is the same as the configuration of the pressing unit 16 described in the first embodiment. The first pressing unit 16*a* corresponds to one example of the pressing section. The first bearing 17*a* corresponds to one example of the bearing unit.

The first bearing 17*a* includes the first driven portion 18*a*. The first bearing 17*a* is supported by the first bearing supporting member 19*a*. The first driven portion 18*a* is brought into contact with the driving-roller circumferential surface 8*a*, and presses the driving roller 8. The first driven portion 18*a* illustrated in FIG. 6 is brought into contact with the driving-roller circumferential surface 8*a* at the central portion of the driving roller 8 in the axial direction of the driving roller shaft 8*b*. The first driven portion 18*a* corresponds to one example of the contact portion. The first bearing supporting member 19*a* supports the first bearing 17*a* at one end portion thereof in the X-axis direction, and is supported by the support frame 14 at the other end portion thereof in the X-axis direction.

The fifth pressing unit 16*e* presses a portion of the driven-roller circumferential surface 9*a* of the driven roller 9. The fifth pressing unit 16*e* presses the central portion of the driven roller 9 in the axial direction of the driving roller shaft 8*b*. The fifth pressing unit 16*e* presses the driven-roller circumferential surface 9*a* on an inner side of the medium transporting belt 10. The fifth pressing unit 16*e* includes a fifth bearing 17*e* and a fifth bearing supporting member 19*e*. The configuration of the fifth pressing unit 16*e* is the same as the configuration of the first pressing unit 16*a*. The fifth pressing unit 16*e* corresponds to one example of a second-roller pressing section. The fifth bearing 17*e* corresponds to one example of a second-roller bearing unit.

The fifth bearing 17*e* includes a fifth driven portion 18*e*. The fifth bearing 17*e* is supported by the fifth bearing supporting member 19*e*. The fifth driven portion 18*e* corresponds to one example of a second-roller contact portion. The fifth driven portion 18*e* is brought into contact with the driven-roller circumferential surface 9*a*, and presses the driven roller 9. The fifth driven portion 18*e* is brought into contact with the driven-roller circumferential surface 9*a* at the central portion of the driven roller 9 in the axial direction of the driven roller shaft 9*b*. The fifth bearing supporting member 19*e* supports the fifth bearing 17*e* at one end portion thereof in the X-axis direction, and is supported by the support frame 14 at the other end portion thereof in the X-axis direction.

The first pressing unit 16*a* reduces the deformation in the −X direction occurring in the driving roller 8 due to the tension of the medium transporting belt 10. The fifth pressing unit 16*e* reduces the deformation in the +X direction occurring in the driven roller 9 due to the tension of the medium transporting belt 10. As the first pressing unit 16*a* and the fifth pressing unit 16*e* are provided, it is possible to reduce a difference in peripheral speeds occurring in the medium transporting belt 10 between the belt central portion and the belt end portion of the medium transporting belt 10.

The transport unit 3 includes the fifth pressing unit 16*e* including the fifth bearing 17*e* including the fifth driven portion 18*e* brought into contact with the driven-roller circumferential surface 9*a*, the fifth pressing unit 16*e* being configured to press the driven-roller circumferential surface 9*a* on an inner side of the medium transporting belt 10.

As the fifth pressing unit 16*e* is disposed relative to the driven roller 9, it is possible to reduce the deformation of the driven roller 9.

FIG. 7 illustrates the driving roller 8, the driven roller 9, the medium transporting belt 10, the support frame 14, and four pressing units 16. The four pressing units 16 are the first pressing unit 16*a*, the second pressing unit 16*b*, the fifth pressing unit 16*e*, and a sixth pressing unit 16*f*. The driving roller 8, the driven roller 9, the medium transporting belt 10, and the support frame 14 each have the same configuration as that in the first embodiment.

The first pressing unit 16*a* presses a portion of the driving-roller circumferential surface 8*a* of the driving roller 8. The first pressing unit 16*a* presses the central portion of the driving roller 8 in the axial direction of the driving roller shaft 8*b* as viewed from the +Z direction. The first pressing unit 16*a* presses the driving-roller circumferential surface 8*a* on an inner side of the medium transporting belt 10. The first pressing unit 16*a* includes the first bearing 17*a* and the first bearing supporting member 19*a*. The first bearing 17*a* illustrated in FIG. 7 is supported by the first bearing supporting member 19*a*. The end portion, in the +Y direction, of the first bearing 17*a* and the end portion thereof in the −Y direction are supported by the first bearing supporting member 19*a*. The first pressing unit 16*a* corresponds to one example of the pressing section. The first bearing 17*a* corresponds to one example of the bearing unit.

The first bearing 17*a* includes the first driven portion 18*a*. The first bearing 17*a* is supported by the first bearing supporting member 19*a*. The first driven portion 18*a* is brought into contact with the driving-roller circumferential surface 8*a*, and presses the driving roller 8. The first driven portion 18*a* illustrated in FIG. 7 is brought into contact with the driving-roller circumferential surface 8*a* at the +Z direction relative to the imaginary horizontal line VH. The first driven portion 18*a* corresponds to one example of the contact portion. The first bearing supporting member 19*a* supports the first bearing 17*a* at one end portion thereof in the X-axis direction, and is supported by the support frame 14 at the other end portion thereof in the X-axis direction.

The second pressing unit 16*b* presses a portion of the driving-roller circumferential surface 8*a* of the driving roller 8. The second pressing unit 16*b* presses the central portion of the driving roller 8 in the axial direction of the driving roller shaft 8*b* as viewed from the +Z direction. The second pressing unit 16*b* presses the driving-roller circumferential surface 8*a* on an inner side of the medium transporting belt 10. The second pressing unit 16*b* includes the second bearing 17*b* and the second bearing supporting member 19*b*. The second bearing 17*b* illustrated in FIG. 7 is supported by the second bearing supporting member 19*b*. The end portion, at the +Y direction, of the second bearing 17*b* and the end portion thereof at the −Y direction are supported by the second bearing supporting member 19*b*. The configuration of the second pressing unit 16*b* is the same as the configuration of the first pressing unit 16*a* illustrated in FIG. 7.

The second bearing 17*b* includes the second driven portion 18*b*. The second bearing 17*b* is supported by the second bearing supporting member 19*b*. The second driven portion 18*b* is brought into contact with the driving-roller circumferential surface 8*a*, and presses the driving roller 8. The second driven portion 18*b* is brought into contact with the driving-roller circumferential surface 8*a* at the −Z direction relative to the imaginary horizontal line VH. The distance between a position where the second driven portion 18*b* is brought into contact with the driving-roller circumferential surface 8a and the imaginary horizontal line VH is equal to or substantially equal to the distance between a position where the first driven portion 18a is brought into contact with the driving-roller circumferential surface 8a and the imaginary horizontal line VH. The second bearing supporting member 19b supports the second bearing 17b at one end portion thereof in the X-axis direction, and is supported by the support frame 14 at the other end portion thereof in the X-axis direction.

The fifth pressing unit 16e presses a portion of the driven-roller circumferential surface 9a of the driven roller 9. The fifth pressing unit 16e presses the central portion of the driven roller 9 in the axial direction of the driven roller shaft 9b as viewed from the +Z direction. The fifth pressing unit 16e presses the driven-roller circumferential surface 9a on an inner side of the medium transporting belt 10. The fifth pressing unit 16e includes the fifth bearing 17e and the fifth bearing supporting member 19e. The fifth bearing 17e illustrated in FIG. 7 is supported by the fifth bearing supporting member 19e. The end portion, in the +Y direction, of the fifth bearing 17e and the end portion thereof in the −Y direction are supported by the fifth bearing supporting member 19e. The configuration of the fifth pressing unit 16e is the same as the configuration of the first pressing unit 16a illustrated in FIG. 7. The fifth pressing unit 16e corresponds to one example of the second-roller pressing section. The fifth bearing 17e corresponds to one example of the second-roller bearing unit.

The fifth bearing 17e includes the fifth driven portion 18e. The fifth bearing 17e is supported by the fifth bearing supporting member 19e. The fifth driven portion 18e is brought into contact with the driven-roller circumferential surface 9a, and presses the driven roller 9. The fifth driven portion 18e illustrated in FIG. 7 is brought into contact with the driven-roller circumferential surface 9a at the +Z direction relative to the imaginary horizontal line VH. The fifth driven portion 18e corresponds to one example of the second-roller contact portion. The fifth bearing supporting member 19e supports the fifth bearing 17e at one end portion thereof in the X-axis direction, and is supported by the support frame 14 at the other end portion thereof in the X-axis direction.

The sixth pressing unit 16f presses a portion of the driven-roller circumferential surface 9a of the driven roller 9. The sixth pressing unit 16f presses the central portion of the driven roller 9 in the axial direction of the driven roller shaft 9b as viewed from the +Z direction. The sixth pressing unit 16f presses the driven-roller circumferential surface 9a on an inner side of the medium transporting belt 10. The sixth pressing unit 16f includes a sixth bearing 17f and a sixth bearing supporting member 19f. The sixth bearing 17f illustrated in FIG. 7 is supported by the sixth bearing supporting member 19f. The end portion, in the +Y direction, of the sixth bearing 17f and the end portion thereof in the −Y direction are supported by the sixth bearing supporting member 19f. The configuration of the sixth pressing unit 16f is the same as the configuration of the fifth pressing unit 16e illustrated in FIG. 7.

The sixth bearing 17f includes a sixth driven portion 18f. The sixth bearing 17f is supported by the sixth bearing supporting member 19f. The sixth driven portion 18f is brought into contact with the driven-roller circumferential surface 9a, and presses the driven roller 9. The sixth driven portion 18f is brought into contact with the driven-roller circumferential surface 9a at the −Z direction relative to the imaginary horizontal line VH. The distance between a position where the sixth driven portion 18f is brought into contact with the driven-roller circumferential surface 9a and the imaginary horizontal line VH is equal to or substantially equal to the distance between a position where the fifth driven portion 18e is brought into contact with the driven-roller circumferential surface 9a and the imaginary horizontal line VH. The sixth bearing supporting member 19f supports the sixth bearing 17f at one end portion thereof in the X-axis direction, and is supported by the support frame 14 at the other end portion thereof in the X-axis direction.

Fourth Embodiment

A fourth embodiment describes the schematic configuration of the transport unit 3 including a pressing-force adjusting mechanism. FIGS. 8, 9, 10, and 11 each illustrate the schematic configuration of the transport unit 3 including the pressing-force adjusting mechanism. The pressing-force adjusting mechanism corresponds to one example of an adjustment unit. FIGS. 8, 9, 10, and 11 each illustrate the schematic configuration of the transport unit 3 as viewed from the +Y direction. In FIGS. 8, 9, 10, and 11, the pressure applying roller 12 is not illustrated.

FIGS. 8, 9, 10, and 11 each illustrate the driving roller 8, the driven roller 9, the medium transporting belt 10, the support frame 14, and the pressing unit 16. The driving roller 8, the driven roller 9, the medium transporting belt 10, and the support frame 14 each have the same configuration as that in the first embodiment.

Figure 8:
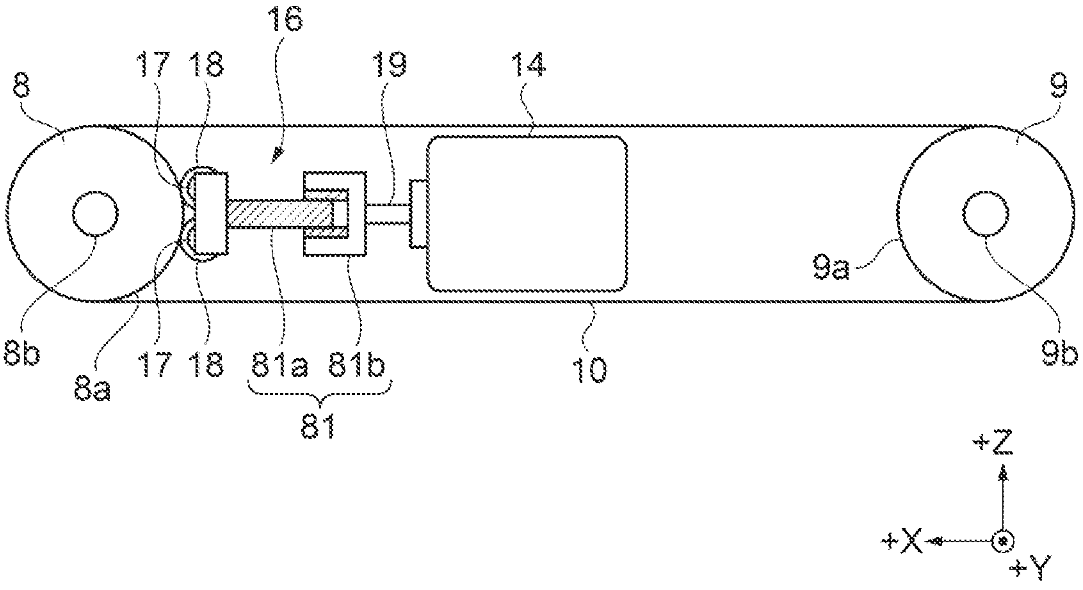
FIG. 8 is a diagram illustrating a schematic configuration of the transport unit including a pressing-force adjusting mechanism as viewed from the +Y direction.

FIG. 8 illustrates the schematic configuration of the transport unit 3 including the pressing-force adjusting mechanism. FIG. 8 illustrates the configuration in which the pressing unit 16 includes the pressing-force adjusting mechanism. FIG. 8 illustrates a screw mechanism 81 serving as the pressing-force adjusting mechanism.

The pressing unit 16 illustrated in FIG. 8 includes two bearings 17, the bearing supporting member 19, and the screw mechanism 81. As illustrated in FIG. 8, the pressing unit 16 includes two or more bearings 17. The two bearings 17 each include the driven portion 18 brought into contact with the driving-roller circumferential surface 8a. The two bearings 17 is supported by the bearing supporting member 19 through the screw mechanism 81. The bearing supporting member 19 has one end portion configured to support the two bearings 17 through the screw mechanism 81, and has the other end portion configured to be supported by the support frame 14.

The screw mechanism 81 is configured to adjust the pressing force with which the pressing unit 16 presses the driving roller 8. The screw mechanism 81 is provided between the bearings 17 and the bearing supporting member 19. The screw mechanism 81 includes a screw portion 81a and a screw hole 81b. One end portion of the screw portion 81a in the X-axis direction is configured to support the bearings 17. The other end portion of the screw portion 81a in the X-axis direction is configured to have a spiral groove formed thereon. The other end portion of the screw portion 81a in the X-axis direction is fitted into the screw hole 81b. As a user adjusts the amount of fitting of the screw portion 81a fitted into the screw hole 81b, the pressing force of the driven portion 18 that presses against the driving-roller circumferential surface 8a is adjusted.

Figure 9:
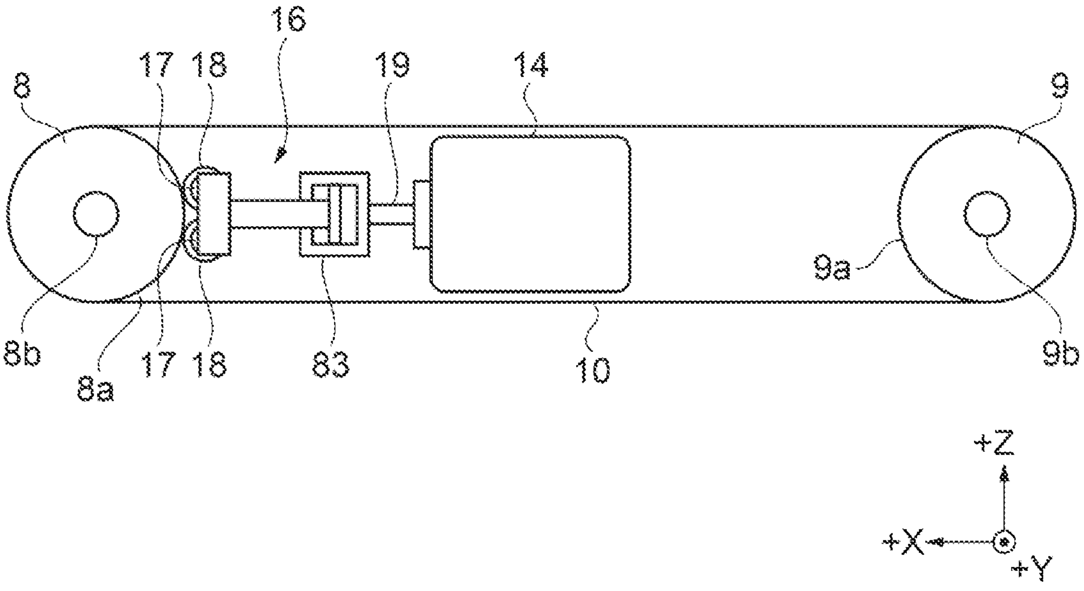
FIG. 9 is a diagram illustrating a schematic configuration of the transport unit including the pressing-force adjusting mechanism as viewed from the +Y direction.

FIG. 9 illustrates the schematic configuration of the transport unit 3 including the pressing-force adjusting mechanism. FIG. 9 illustrates a configuration in which the pressing unit 16 includes the pressing-force adjusting mechanism. FIG. 9 illustrates an air cylinder 83 serving as the pressing-force adjusting mechanism.

The pressing unit 16 illustrated in FIG. 9 includes two bearings 17, the bearing supporting member 19, and the air cylinder 83. The two bearings 17 each include the driven portion 18 brought into contact with the driving-roller circumferential surface 8*a*. The two bearings 17 are supported by the bearing supporting member 19 through the air cylinder 83. The bearing supporting member 19 supports, through the air cylinder 83, the two bearings 17 at one end portion thereof in the X-axis direction, and is supported by the support frame 14 at the other end portion thereof in the X-axis direction.

The air cylinder 83 is configured to adjust the pressing force with which the driving roller 8 is pressed by the pressing unit 16. One end portion of the air cylinder 83 in the X-axis direction supports the bearing 17. The other end portion of the air cylinder 83 in the X-axis direction is supported by the bearing supporting member 19. The air pressure within the air cylinder 83 is adjusted to adjust the pressing force with which the driven portion 18 presses the driving-roller circumferential surface 8*a*. The air pressure within the air cylinder 83 may be adjusted by manual operation of a user. The air pressure within the air cylinder 83 may be adjusted so as to be a desired air pressure by using a control mechanism that is not illustrated in the drawing.

Figure 10:
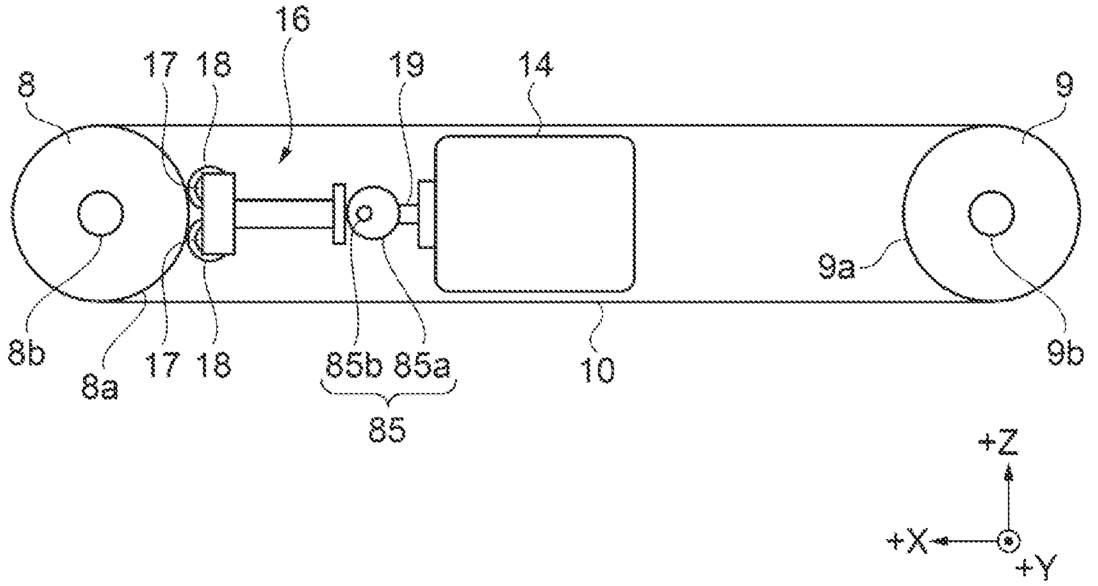
FIG. 10 is a diagram illustrating a schematic configuration of the transport unit including the pressing-force adjusting mechanism as viewed from the +Y direction.

FIG. 10 illustrates the schematic configuration of the transport unit 3 including the pressing-force adjusting mechanism. FIG. 10 illustrates a configuration in which the pressing unit 16 includes the pressing-force adjusting mechanism. FIG. 10 illustrates a cam mechanism 85 serving as the pressing-force adjusting mechanism.

The pressing unit 16 illustrated in FIG. 10 includes two bearings 17, the bearing supporting member 19, and the cam mechanism 85. The two bearings 17 each include the driven portion 18 brought into contact with the driving-roller circumferential surface 8*a*. The two bearings 17 are supported by the bearing supporting member 19 through the cam mechanism 85. The bearing supporting member 19 supports the two bearings 17 through the cam mechanism 85 at one end portion thereof in the X-axis direction, and is supported by the support frame 14 at the other end portion thereof in the X-axis direction.

The cam mechanism 85 is configured to adjust the pressing force with which the driving roller 8 is pressed by the pressing unit 16. The cam mechanism 85 is supported by the bearing supporting member 19. The cam mechanism 85 includes a cam member 85*a* and a cam rotary shaft 85*b*. With driving of a cam-rotation driving mechanism that is not illustrated in the drawing, the cam member 85*a* rotates. The cam rotary shaft 85*b* supports the cam member 85*a*. The cam rotary shaft 85*b* is a rotary shaft of the cam member 85*a*. The cam member 85*a* rotates with the cam rotary shaft 85*b* being the center. As one example, the cam mechanism 85 is configured such that the angle of rotation of the cam member 85*a* is adjusted by a mechanism for controlling the angle of rotation, which is not illustrated in the drawing. By adjusting the angle of rotation of the cam member 85*a*, the pressing force with which the driven portion 18 presses against the driving-roller circumferential surface 8*a* is adjusted.

Figure 11:
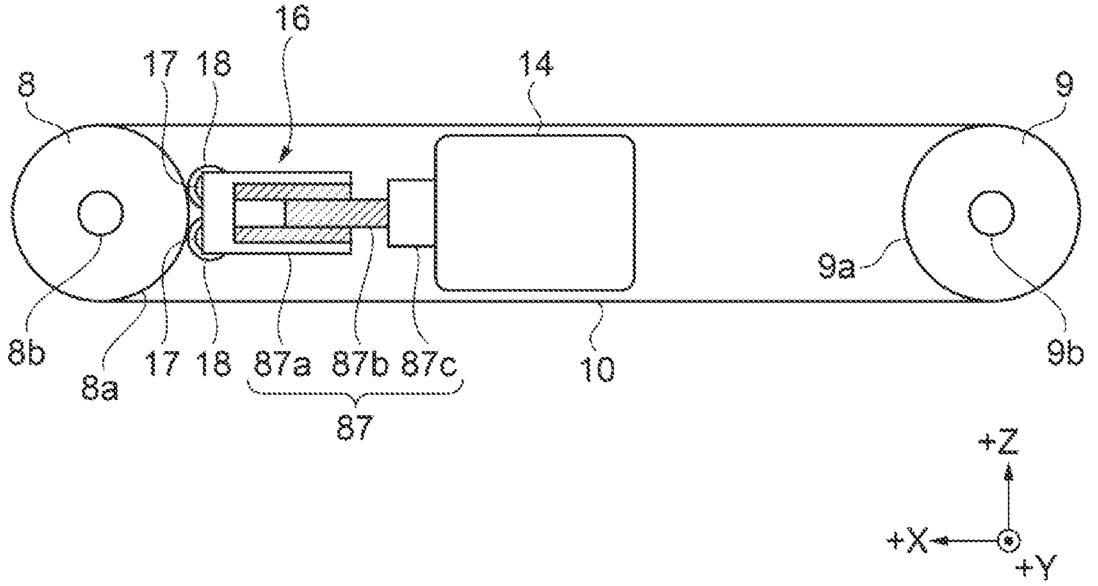
FIG. 11 is a diagram illustrating a schematic configuration of the transport unit including the pressing-force adjusting mechanism as viewed from the +Y direction.

FIG. 11 illustrates the schematic configuration of the transport unit 3 including the pressing-force adjusting mechanism. FIG. 11 illustrates a configuration in which the pressing unit 16 includes the pressing-force adjusting mechanism. FIG. 11 illustrates an electrically powered actuator 87 serving as the pressing-force adjusting mechanism.

The pressing unit 16 illustrated in FIG. 11 includes two bearings 17 and the electrically powered actuator 87. The two bearings 17 each include the driven portion 18 brought into contact with the driving-roller circumferential surface 8*a*. The two bearings 17 are supported by the electrically powered actuator 87. The electrically powered actuator 87 is supported by the support frame 14.

The electrically powered actuator 87 is configured to adjust the pressing force with which the driving roller 8 is pressed by the pressing unit 16. The electrically powered actuator 87 includes a rod 87*a*, a ball screw 87*b*, and a motor 87*c*. The rod 87*a* supports the two bearings 17. With rotation of the ball screw 87*b*, the rod 87*a* moves in the +X direction or the −X direction. The ball screw 87*b* rotates with rotational force generated at the motor 87*c*. As the ball screw 87*b* rotates to move the rod 87*a* along the X-axis. The motor 87*c* generates the rotational force that causes the ball screw 87*b* to rotate. With a motor controlling mechanism that is not illustrated in the drawing, the motor rotational direction and the motor rotational speed of the motor 87*c* are controlled. With the motor controlling mechanism, the position of the electrically powered actuator 87 is adjusted along the X-axis of the rod 87*a*. As the position of the rod 87*a* along the X-axis is adjusted, the pressing force with which the driven portion 18 presses against the driving-roller circumferential surface 8*a* is adjusted.

The transport unit 3 includes the pressing-force adjusting mechanism provided at the pressing unit 16 and configured to adjust the pressing force with the pressing unit 16.

As the pressing-force adjusting mechanism adjusts the pressing force with which the driving roller 8 is pressed, it is possible to adjust the amount of deformation of the driving roller 8 occurring due to the medium transporting belt 10.

FIGS. 8, 9, 10, and 11 each illustrate a configuration in which the pressing unit 16 including the pressing-force adjusting mechanism presses the driving roller 8. However, the configuration is not limited to this. The pressing unit 16 including the pressing-force adjusting mechanism may press the driven roller 9. The pressing-force adjusting mechanism illustrated in FIGS. 8, 9, 10, and 11 may be used in the pressing unit 16 described in the first embodiment, the second embodiment, or the third embodiment.

What is claimed is:

1. A transport device comprising:

a transporting belt having an endless shape and configured to transport a medium;

a first roller including a first circumferential surface brought into contact with the transporting belt, the first roller being a roller around which the transporting belt is wound;

a second roller including a second circumferential surface brought into contact with the transporting belt, the second roller being a roller around which the transporting belt is wound;

a pressing section including a bearing unit including a contact portion brought into contact with the first circumferential surface, the pressing section being configured to press the first circumferential surface on an inner side of the transporting belt; and a support portion disposed on an inner side of the transporting belt and configured to support the pressing section.

2. The transport device according to claim 1, comprising an adjustment unit provided at the pressing unit and configured to adjust a pressing force by the pressing unit.

3. The transport device according to claim 1, comprising a second pressing section including a second bearing unit including a second contact portion brought into contact with the first circumferential surface, the second pressing section being configured to press the first circumferential surface on an inner side of the transporting belt.

4. The transport device according to claim 1, comprising a second-roller pressing section including a second-roller bearing unit including a second-roller contact portion brought into contact with the second circumferential surface, the second-roller pressing section being configured to press the second circumferential surface on an inner side of the transporting belt.

5. The transport device according to claim 1, wherein the first roller is a crown roller.

6. A recording device comprising:

a transporting belt having an endless shape and configured to transport a medium;

a first roller including a first circumferential surface brought into contact with the transporting belt, the first roller being a roller around which the transporting belt is wound;

a second roller including a second circumferential surface brought into contact with the transporting belt, the second roller being a roller around which the transporting belt is wound;

a pressing section including a bearing unit including a contact portion brought into contact with the first circumferential surface, the pressing section being configured to press the first circumferential surface on an inner side of the transporting belt;

a support portion disposed on an inner side of the transporting belt and configured to support the pressing section; and a recording unit configured to perform recording on the medium transported by the transporting belt.

* * * * *